Figure 1:
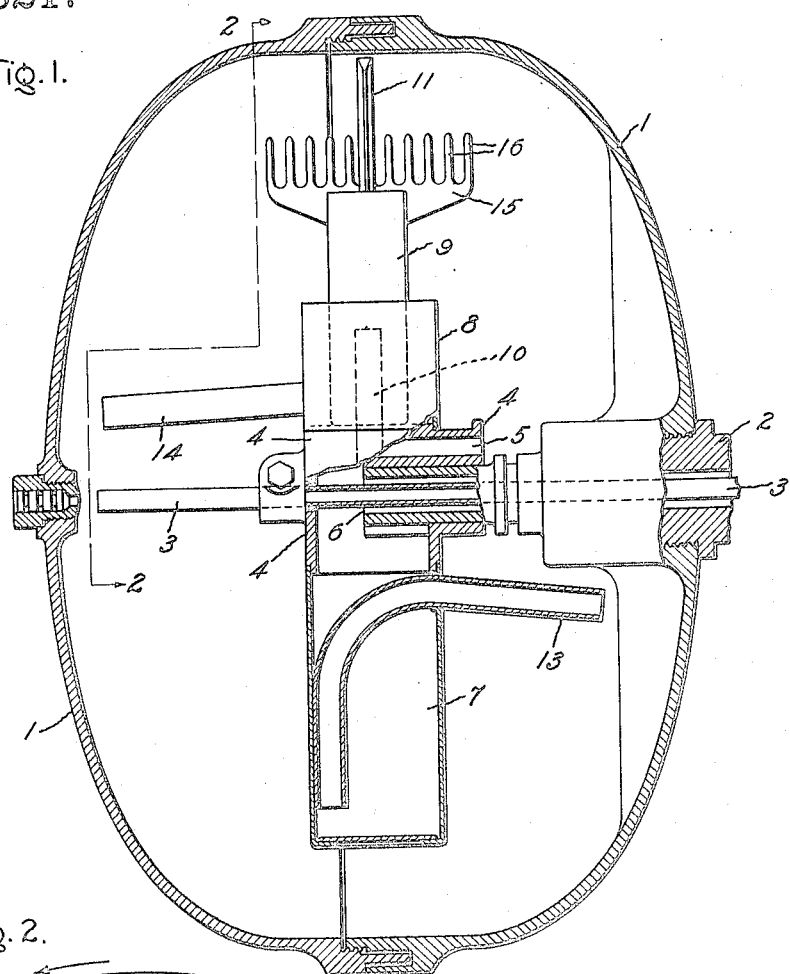

C. ORR.
ROTARY REFRIGERATING MACHINE.
APPLICATION FILED NOV. 28, 1917.

1,281,821.

Patented Oct. 15, 1918.

Inventor:
Clark Orr,
by
His Attorney.

UNITED STATES PATENT OFFICE.

CLARK ORR, OF FORT WAYNE, INDIANA, ASSIGNOR TO GENERAL ELECTRIC COMPANY, A CORPORATION OF NEW YORK.

ROTARY REFRIGERATING-MACHINE.

1,281,821.　　　　　　Specification of Letters Patent.　　Patented Oct. 15, 1918.

Application filed November 28, 1917. Serial No. 204,315.

*To all whom it may concern:*

Be it known that I, CLARK ORR, a citizen of the United States, residing at Fort Wayne, county of Allen, State of Indiana, have invented certain new and useful Improvements in Rotary Refrigerating-Machines, of which the following is a specification.

My present invention relates to rotary refrigerating machines of the type in which a suitable material, such as sulfur dioxid, in the form of a saturated or approximately saturated vapor or gas is confined in a hermetically sealed container, and is in the compressor portion of the container acted upon mechanically to cause it to liquefy and lose potential energy in the form of heat which is transmitted to and dissipated by a medium outside that portion of the container, in order that the material within the container may effect refrigeration of a medium surrounding another or refrigerator portion of the container by absorbing heat therefrom as it vaporizes within that portion of the container. Besides the sulfur dioxid or similar material mentioned, the container also has a lubricant therein for lubricating the working parts of the refrigerating machine. Such a machine is described in the U. S. patent to Audiffren and Singrun, No. 1,155,780, dated Oct. 15, 1915, and the U. S. patent to J. J. Wood, No. 1,164,245, dated Dec. 14, 1915.

The refrigerator portion of the container of such a machine contains a combined liquid and lubricant separator and my invention has particularly to do with an improvement in the construction of this portion of such a machine. The separators of such machines have heretofore been constructed with a collector or scoop for deflecting a quantity of liquid refrigerant and lubricant into the separator where they are separated by gravity, the liquid refrigerant settling at the bottom and forcing the lubricant or oil ahead of it. The construction of the collectors was such that they deflected a larger quantity of liquid and lubricant into the separator than is necessary, which does not give the separator sufficient time to properly separate the liquid and lubricant.

In accordance with one aspect of my invention, I provide a novel collector which deflects much less liquid and lubricant into the separator than those heretofore used, whereby a much better separation of liquid and lubricant is obtained than was possible heretofore.

My invention consists in another aspect, in the combination with a collector for deflecting liquid and lubricant into the separator, of an agitator mounted to the rear of the collector, whereby the liquid is broken up after it has passed the collector and the evaporation of the liquid refrigerant is facilitated.

Figure 2:
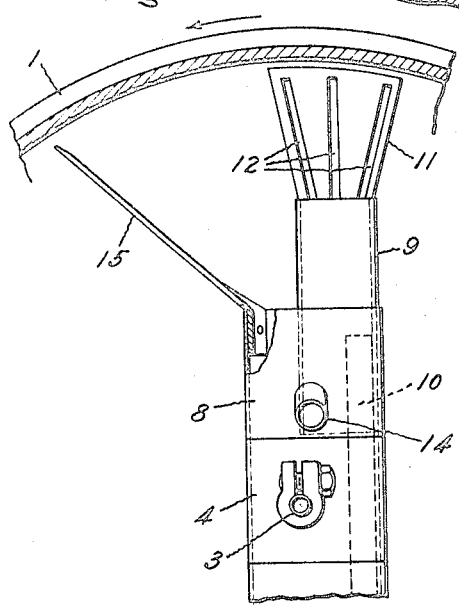
Figure 3:
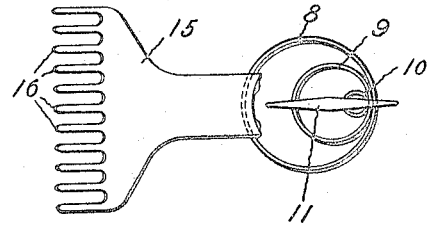

Other features of novelty which characterize my invention are pointed out with particularity in the claims annexed to and forming a part of this specification. For a better understanding of my invention, reference may be had to the following description taken in connection with the accompanying drawing, in which Figure 1 is a sectional view through the refrigerator portion of the container of a refrigerating machine, showing the separator partly in section and embodying my invention; Fig. 2 is a view of Fig. 1 taken on the sectional line 2—2, and looking in the direction of the arrow, and Fig. 3 is a top plan view of the separator of Figs. 2 and 3.

Referring to the drawing, 1 is the refrigerator portion of the hermetically sealed container of a refrigerating machine which is connected by a hollow shaft 2 to the condenser portion of the machine. Projecting into the portion 1 of the container is a hollow stationary shaft 3 on which is mounted the combined liquid and lubricant separator which comprises a central casting 4 which provides a loose supporting bearing on the end of the hollow shaft 2, a passage 5 from the refrigerator end of the machine above the shaft 2 by which vapor from this end of the machine may pass downwardly and into the end of the hollow shaft, and a passage 6 at the end of the hollow shaft 2 by which lubricant may pass from a separator chamber 7 upwardly and flow into the end of the hollow shaft. The pipe 3 passes entirely through the casting 4 and discharges against the wall of the condenser 1. The casting 4 is secured to this pipe, as will be seen from Figs. 1 and 2, whereby the separator is held stationary with this pipe. A cylindrical receiver 8 open at its top is mounted on the casting 4, the bottom of this receiver being formed by this casting. A smaller cylindrical receiver 9 is mounted within the receiver 8 adjacent its forward wall, that is, that wall toward which the outer shell of the container moves as is indicated by the arrow in Fig. 2. The casting 4 also forms the bottom of this receiver 9. A tube 10 provides communication between the receiver 9 and the separator chamber 7.

A fin-shaped collector or scoop 11 is mounted on the upper edge of the receiver 9 and extends upwardly into a revolving annulus of refrigerating liquid and lubricant in the container 1. This collector or scoop 11 is provided with slots 12 and is preferably tapered from the center toward the forward and rearward edges as is clearly seen in Fig. 3. The collector 11 deflects a small stream of the liquid from the inner surface of the revolving annulus of liquid by means of the slots 12 into the receiver 9. The mixed lubricant and refrigerant flow down the tube 10 which connects the receiver 9 with the separating chamber 7, into the separating chamber where the lubricant and liquid refrigerant are separated by gravity, the liquid refrigerant being the heavier will settle at the bottom while the lubricant will rise to the top. Whenever the level of the lubricant rises above the passage 6 it will be sucked back to the compressor through the hollow shaft 2. The overflow pipe 13 extends upwardly from near the bottom of the separating chamber 7, passes through the side wall of this chamber so as to discharge liquid refrigerant against the wall of the container 1. A certain amount of liquid refrigerant carried down by the collector 11, finds its way down the outside of the receiver 9 into the receiver 8, from which it flows by a distributing pipe 14, against the wall of the container.

Mounted on the receiver 8 to the rear of the collector 11 is an agitator 15, this agitator 15 has a plurality of projecting teeth 16 extending into the liquid adjacent the periphery of the container 1. This agitator has the appearance of a rake. In the operation of such refrigerating machines as described above, the liquid refrigerant such as sulfur dioxide is heavier than the lubricant and therefore, by the action of the centrifugal force, forms a layer next to the surface of the container whereas the oil being lighter is formed as a film on top of the sulfur dioxid. This film of oil acts as a blanket and retards the evaporation of the sulfur dioxid. By using an agitator, such as that described, this film of oil which has passed the collector 11 is broken up, making it much easier for the sulfur dioxid to evaporate, and thus the capacity of the refrigerating machine at the lower temperatures is materially increased.

The collector 11 is given the peculiar shape described and shown in the drawing so that it will enter and leave the liquids with as little disturbance as possible and the slots are provided for carrying the correct amount of liquid into the chambers of the separator. By shaping the collector so that it creates as little disturbance of the liquid as possible, the mixing or emulsifying of the lubricant and refrigerant is prevented. By taking down or deflecting the correct amount of liquid and oil into the separator without emulsifying it, I am able to get a much better oil separation than has been possible heretofore. By the use of my agitator and collector together I have found it possible to increase the heat absorption of such a refrigerating machine by about ten per cent., that is, I obtain about ten per cent. better heat absorption than has been obtained heretofore.

I desire it to be understood that my invention is not limited to the particular arrangement shown and described and is applicable to other forms of separators than that described, and I aim in the appended claims to cover all modifications that do not depart from the spirit and scope of my invention.

What I claim as new and desire to secure by Letters Patent of the United States, is:—

1. In a refrigerating machine, the combination with a rotatable container and a separator therein, of a fin-shaped collector provided with a slot and mounted to convey liquid from adjacent the periphery of said container to said separator.

2. In a refrigerating machine, the combination with a rotatable container and a separator therein, of a collector having a tapered section and provided with a slot, said collector being mounted to convey liquid from adjacent the periphery of said container to said separator.

3. In a refrigerating machine, the combination with a rotatable container and a separator therein, of a collector having a section tapered from the center toward the forward and rearward edges and provided with a slot, said collector being mounted to convey liquid from adjacent the periphery of said container to said separator.

4. In a refrigerating machine, the combination with a rotatable container and a separator therein, of a collector having a section tapered from the center toward the forward and rearward edges and provided with a plurality of slots, said collector being mounted to convey liquid from adjacent the periphery of said container to said separator.

5. In a refrigerating machine, the combination with a rotatable container and separator therein, of a collector mounted to convey liquid from adjacent the periphery of said container to said separator, and an agitator mounted to the rear of said collector for breaking up the liquid adjacent the periphery of said container.

6. In a refrigerating machine, the combination with a rotatable container and separator therein, of a collector mounted to convey liquid from adjacent the periphery of said container to said separator, and an agitator mounted to the rear of said collector, said agitator comprising a plurality of projecting teeth extending into the liquid adjacent the periphery of said container.

7. In a refrigerating machine, the combination with a rotatable container and separator therein, of a collector mounted to convey liquid from adjacent the periphery of said container to said separator, and an agitator mounted to the rear of said collector, said agitator being in the form of a rake and comprising a plurality of projecting teeth extending into the liquid adjacent the periphery of said container.

In witness whereof I have hereunto set my hand this 23rd day of November, 1917.

CLARK ORR.